TRAFFIC CONTROLLERS EMPLOYING STATIC, LOGIC CONTROL ELEMENTS

Original Filed July 3, 1958 3 Sheets-Sheet 1

INVENTORS
G. DONALD HENDRICKS
GARLAND E. FIESER
BY
Bruno C. Leikhim
Attorney

TRAFFIC CONTROLLERS EMPLOYING STATIC, LOGIC CONTROL ELEMENTS

Original Filed July 3, 1958 3 Sheets-Sheet 2

INVENTORS
G. DONALD HENDRICKS
GARLAND E. FIESER
BY
Bruno C Lechler
Attorney

TRAFFIC CONTROLLERS EMPLOYING STATIC, LOGIC CONTROL ELEMENTS

Original Filed July 3, 1958 3 Sheets-Sheet 3

INVENTORS
G. DONALD HENDRICKS
GARLAND E. FIESER
BY
Bruce C. Bechler
Attorney

United States Patent Office

Re. 26,150
Reissued Jan. 31, 1967

26,150
TRAFFIC CONTROLLERS EMPLOYING STATIC, LOGIC CONTROL ELEMENTS

George Donald Hendricks and Garland E. Fieser, East Moline, Ill., assignors to E. W. Bliss Company, Canton, Ohio, a corporation of Delaware Original No. 3,072,883, dated Jan. 8, 1963, Ser. No. 746,488, July 3, 1958. Application for reissue Jan. 5, 1965, Ser. No. 438,448
28 Claims. (Cl. 340—37)

Matter enclosed in heavy brackets [ ] appears in the original patent but forms no part of this reissue specification; matter printed in italics indicates the additions made by reissue.

This invention relates to vehicular traffic signal control devices of the type employing solid state means, such as saturable core reactors and static, logic control elements. The invention is further characterized as employing static, solid state logic control elements in a plurality of timing groups to control and time traffic on two or more intersecting streets. The invention eliminates all moving parts, electron tubes, and switch contacts.

It has long been the goal of traffic control equipment manufacturers to build a controller having no moving parts, requiring little or no maintenance, and having the highest reliability. The higher cost of such equipment could be economically justified by its greater reliability, longer service life, and lower maintenance cost. Since the units described herein have no electric contacts or moving parts, their life is independent of the number of cycles of operation they perform.

In traffic controller applications, those portions of the controller which receive signals from the traffic actuated detectors associated with the controller may be called upon to operate 8 to 10 million times per year. This represents an average of 11,000 vehicles per day, with each vehicle actuating the detector twice, once for each axle.

That portion of the controller which changes the traffic signal indications normally operate six times to complete a traffic signal cycle with a cycle being completed at the rate of approximately one per minute. The annual rate is 5,256,000 signal changes per year. Traffic control equipment should normally be built to last at least 10 years or 100,000,000 operations. This is difficult to achieve with the present-day components having moving parts and make and break contacts.

The design of traffic signal control devices has been entirely re-assessed and a novel concept of control has been invented. The invention attempts to duplicate all the logic processes normally carried out by a well trained, intelligent person directing traffic at the intersection. Because a computer or electronic brain cannot think and can only provide for those conditions which the design has taken into consideration, means to effect all of the important decisions have been included in the design.

The invention achieves longer life and improved reliability by eliminating relays, make-and-break contacts, and electro-mechanical timers, and utilizing the entirely new concept of static, logic control. Static is herein defined as having no moving parts. Logic is herein defined as employing predetermined reasoning with electrical signals. *Solid state, as used herein, means solids as defined under the term "solid-state physics" in "The International Dictionary of Physics and Electronics" by Van Nostrand, copyright 1956, by D. Van Nostrand Company, Inc., (Library of Congress, Catalog Card No. 56–11759, Patent Office Scientific Library Card No. QC,5,I5).* Control functions are designed into the electrical circuitry to permit all of the functions normally accomplished by timers and relays to be accomplished by static, logic control elements.

The invention applies both to traffic actuated controllers and to those that operate on a fixed cycle alloting time successively to traffic in each lane. The invention applies to two-phase and three-phase, semi-actuated and full-actuated controllers but will be described in terms of a two-phase semi-actuated controller. A three-phase fully actuated controller is also described in a final section.

The function of each type of traffic signal controller can be described in terms of specific reactions to certain traffic conditions. For example, the function of a two-phase semi-actuated controller is to energize the green signal to main street traffic until a vehicle arrives on the cross street. After a suitable traffic cange indication to main street traffic, a main street guarantee period having expired, the green signal on cross street is illuminated. Continued vehicle arrivals on cross street maintain the green signal until a maximum time has expired. At this time a traffic change indication is given to cross street traffic and the right-of-way indication transferred to main street. The controller remembers, should it be the case, that the cross street signal changed before all traffic had passed, and accordingly returns the right-of-way indication to cross street traffic after the main street guarantee period. If no more ttraffic arrives on the cross street, right-of-way is returned to main street.

All of the function performed by the two-phase controller are translatable into operations which static, logic control elements are able to perform. Standard logic control elements are usually classified as AND, OR, NOT, MEMORY and DELAY units. A short description of the operation of each unit is given below:

AND unit. Two or more control inputs must be applied at the same time in order to produce an output.

OR unit. One or more control inputs may be applied in order to produce an output.

NOT unit. An output is produced as long as an input is not applied. When an input is applied, the output ceases.

MEMORY unit. A continuous output is produced after a momentary application of input to the "on" section of the unit. The output ceases after a momentary application of input to the "off" section of the unit.

DELAY unit. An output is produced a preset interval after an output is applied, and continues for the remainder of the input application.

[Saturable]. The static, solid state saturable elements used in the circuits disclosed in this application are of the type manufactured by the General Electric Company and described in their publication entitled "General Electric Static Control Application Manual" dated May, 1957. The circuits are naturally not limited to only one type or one manufacturer's components.

In the interest of clarity the various power supply circuits for the components are not shown in the drawings. One skilled in the art will be able to supply the various power circuits from information available in the above named publication.

The object of the invention is to provide a highly reliable traffic signal controller employing static, solid state logic control and delay elements eliminating all contacts, relays and electron tubes.

Another object is to provide a traffic signal controller whose service life is independent of the number of operations or cycles it is subjected to.

Another object is to provide a traffic actuated controller employing AND, OR, NOT, MEMORY and DELAY static control elements and amplifiers, eliminating all moving parts, relays and contactors.

Another object is to provide a traffic signal controller in which the time delay intervals are obtained from static, magnetic delay elements.

Another object is to provide a traffic signal controller using no moving parts.

No claim is made to any of the various elements used in the static controller. The AND, OR, NOT, DELAY, MEMORY and amplifier units are well known in the art. No claim is made to the power supply circuits, bias circuits, or pulsing circuits, as these circuits are also well known in the art.

The preferred embodiments of the invention will be described with reference to the following drawings in which like parts are so designated and carried throughout the drawings.

Controller functions

Before the circuit diagrams are explained, the basic functional requirements of a simple, two-street semi-actuated traffic signal controller will be analyzed. These functions are:

(1) To dwell favoring main street traffic.

(2) To sense vehicle arrivals on cross street.

(3) To favor cross street traffic after giving main street traffic a clearing interval.

(4) To favor cross street traffic for a period proportional to such traffic.

(5) To favor main street traffic after a clearing interval after either (a) Cross street traffic is exhausted, or (b) A cross street maximum period has expired.

(6) To favor cross street traffic after a clearing interval after:

(a) A main street minimum period, and (b) Memory that some traffic remained on cross street, or (c) Arrival of new cross street traffic.

Signal energization

Figure 1:
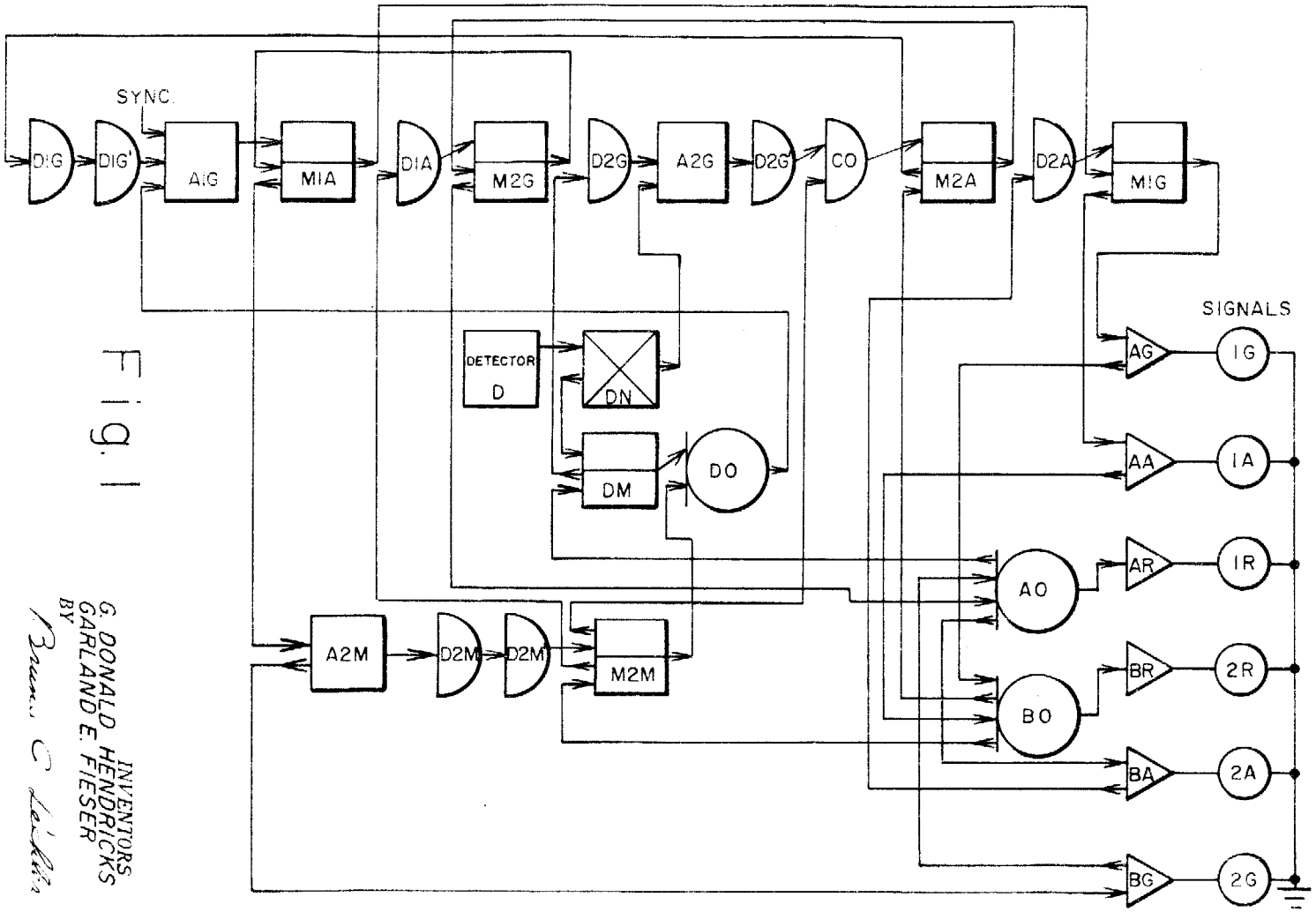
FIGURE 1 is a schematic diagram of a two-phase semi-actuated traffic signal controller employing static, logic control and delay elements. Six amplifiers are used to energize the traffic signals.
Figures 2, 2A:
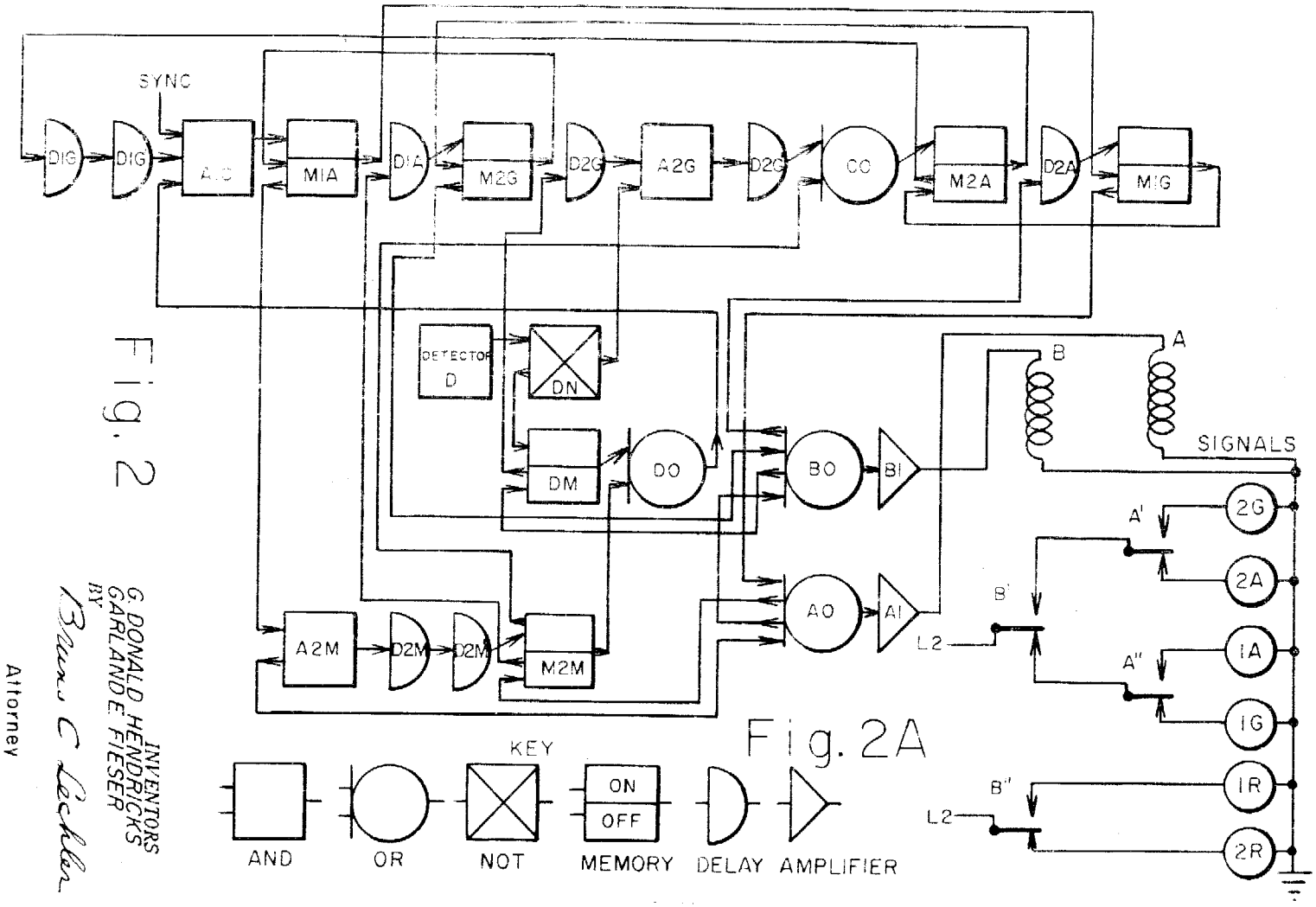
FIGURE 2 is a schematic diagram of a similar two-phase semi-actuated traffic signal controller wherein two amplifiers are used to energize load relays which in turn energize the traffic signals.
FIGURE 2A is a key showing the various logic element symbols and their common designation.

Two methods used to energize the signals will now be explained to facilitate understanding of the controller and to simplify its explanation. Refer to FIGURES 1 and 2.

The form of the invention shown in FIGURE 1 employs an amplifier for each set of traffic signals. All main street green signals are connected to one amplifier, for example, with all main street red signals connected to a second amplifier, and all main street amber signals connected to a third amplifier. Three additional amplifiers are employed to energize the cross street signals. In this form of the invention the elimination of moving parts is carried to the fullest extent, and no mechanical devices or relays are used.

In a second form of the invention, load relays may be substituted for the individual amplifiers for each signal at a saving in cost but with a loss in reliability. A compromise between cost and reliability is thus effected in the form of the invention shown in FIGURE 2. Here, two magnetic amplifiers are used to energize two load relays in various combinations to energize six traffic signals.

The latter form is particularly advantageous when the traffic signals are located at a distance from the controller and an electric cable interconnects the two. The form shown in FIGURE 1 would require a six conductor cable plus a return. The latter form requires only a two conductor cable plus a return. The two conductors may also be of lesser conductivity than the six conductors because they merely energize a load relay at the signals rather than energize the signals as in the first form.

In FIGURE 1 an amplifier is employed to energize each traffic signal indication. The main street green signals 1G are energized by amplifier AG which is turned on by the main street green MEMORY unit M1G. MEMORY unit M1G also turns on the cross street red signals 2R through amplifier BR and OR unit BO.

The main street amber signals 1A are energized through amplifier AA which is turned on by MEMORY unit M1A. MEMORY unit M1A also maintains the cross street red signals 2R.

When the cross street green signals are to be illuminated, MEMORY unit M2G energizes amplifier BG which energizes the cross street green signals 2G. The same unit also energizes amplifier AR which energizes the main street red signals 1R.

The cross street amber signals 2A are energized through amplifier BA which is energized by MEMORY unit M2A. MEMORY unit M2A also maintains the main street red signals 1R.

The second form of the invention as shown in FIGURE 2 employs two amplifiers to energize two load relays. The two load relays are capable of controlling the six signal indications through a four interval traffic cycle.

Load relays A, B which energize the traffic signals are located at the local controller. Main street signals are represented by 1G, 1A, 1R; cross street signals by 2G, 2A, 2R, and G, A, R symbols alluding to green, amber, and red signal indications. The load relays A, B are each energized by an amplifier A1, B1. Amplifiers A1, B1 are energized through OR units AO, BO, respectively. If neither amplifier A1 nor B1 is energized the main street green signal 1G and the cross street red signal 2R are energized from local power over line L2 through the normally closed contacts B′, A″, and B″, respectively, on load relays A, B. Neither relay A nor B is energized during the main street green interval.

When the main street amber signal 1A is to be illuminated, amplifier A1 is energized to pull in load relay A, operating contacts A′, A″. This extinguishes the main street green signal 1G, and illuminates the main street amber signal 1A. The action of contacts A′ has no effect because the movable contact is not energized.

After the amber clearing interval is completed, amplifier B1 is energized. Amplifier B1 energizes relay B operating contacts B′, B″. Contacts B″ illuminate the main street red signal 1R and extinguish the cross street red signal 2R. Contacts B′ illuminate the cross street green signal 2G and extinguish the main street amber signal 1A. Both relays A and B are now energized.

At the end of the cross street green interval, amplifier A1 is deenergized, returning contacts A′, A″ to normal. Contacts A″ have no effect on the signals because the movable contact is not energized. Contacts A′ illuminate the cross street amber signal 2A and extinguish the cross street green signal 2G.

After the amber clearing interval is completed amplifier B1 is deenergized, returning contacts B′, B″ to normal. Contacts B″ illuminate the cross street red signal 2R and extinguish the main street red signal 1R. Contacts B′ illuminate the main street green signal 1G and extinguish the cross street amber signal 2A.

Thus, right-of-way is awarded to the cross street after a clearing interval on main street and then returned to main street after a clearing interval on cross street.

It is understood that amplifiers with different ratings may be used to energize the various groups of signal lamps with different wattage ratings. It is also understood that various types of amplifiers may be used to energize the lamps. Some of the common amplifiers are magnetic, electronic, or electromechanical.

Static, *solid state* logic control elements

The explanation of the invention will be simplified if a few general rules of application are formulated. These rules could be drawn by anyone after a cursory examination of the schematic drawing shown in FIGURES 1 and 2.

(1) A separate DELAY unit will be required to time each traffic interval. Because independent adjustment of each interval is desired an individual DELAY unit will be required for each interval. Also, presently manufactured DELAY units have only limited delay periods and in this embodiment two units are connected in series to obtain some of the longer delay periods.

(2) Each DELAY unit is normally preceded and followed by a MEMORY unit. Because a DELAY unit develops a potential only as long as its input potential is maintained after termination of the timed interval, a MEMORY unit is required following the DELAY unit to remember the potential and furnish an output after the MEMORY unit preceeding the DELAY unit is erased.

(3) Each MEMORY unit when energized into the "on" condition, feeds a current back to the "off" portion of the MEMORY unit next preceding it, to deenergize the latter unit.

(4) An AND unit is used ahead of each DELAY or MEMORY unit when two or more conditions must be present before the DELAY is to start timing or before the MEMORY unit is to be energized into the "on" condition.

(5) An OR unit is used ahead of a DELAY or MEMORY unit when either of several conditions may be present before the DELAY unit is to start timing or the MEMORY unit is to be energized into the "on" condition.

Controller operation

A description of the operation of the controller will now be made with reference to FIGURE 1.

As a starting point assume that the controller is dwelling with the green signal illuminated to main street traffic and the red signal illuminated to cross street. DELAY unit D1G has timed out, energizing DELAY unit D1G'. DELAY unit D1G' has timed out and is applying output to AND unit A1G. It is assumed that no detector actuations have been made by traffic approaching on the cross street and thus no calls are in. The main street green signal 1G was illuminated when DELAY unit D2A completed timing cross street amber signal 2A and energized MEMORY unit M1G which energized amplifier AG. MEMORY unit M1G also energized amplifier BR through OR unit BO to illuminate the cross street red signal 2R.

Assume also that the synchronizing current from a master or other local controller is applied to the SYNC terminal of three input AND unit A1G permitting it to pulse when a call comes in.

Assume now that a vehicle approaches on cross street and actuates detector D which sends a pulse to NOT unit DN and to MEMORY unit DM. The effect of NOT unit DN will be explained later. MEMORY unit DM now furnishes an output to OR unit DO which in turn pulses AND unit A1G. Since all three inputs are present now at AND unit A1G it pulses MEMORY unit M1A which then produces a continuous potential. The continuous potential turns off MEMORY unit M1G, energizes amplifier AA, maintains amplifier BR through OR unit BO, turns off cross street maximum MEMORY unit M2M, and energizes main street amber DELAY unit D1A. When amplifier AA became energized it energized the main street amber signal 1A. When MEMORY unit M1G was turned off it deenergized amplifier AG, extinguishing the main street green signal 1G.

MEMORY unit M1G also stopped energizing amplifier BR through OR unit BO but this had no effect on the cross street red signal 2R, because OR unit BO is maintained energized from MEMORY unit M1A.

DELAY unit D1A times the main street amber signal 1A. When the unit times out it turns on MEMORY unit M2G which develops a continuous potential. The potential turns off MEMORY unit M1A, starts the cross street maximum DELAY unit D2M through isolation unit A2M, energizes amplifier BG to display cross street green signal 2G and amplifier AR through OR unit AO to display main street red signal 1R, turns off detector MEMORY unit DM, and starts DELAY unit D2G.

The function of the cross street maximum DELAY unit D2M will be explained later. When MEMORY unit M1A is turned off it deenergizes amplifier AA extinguishing the main street amber signal 1A.

The controller can be considered to be answering the call from the detector D. Thus, the detector MEMORY unit DM is turned off so that it will be ready to accept another call if a second vehicle actuates detector D and puts in a call to NOT unit DN.

DELAY unit D2G times the initial portion of the cross street right-of-way interval. This represents the average time required by a vehicle stopped at the intersection to start up and enter the intersection. At the termination of the initial interval DELAY unit D2G sends a pulse to AND unit A2G. Control current is already applied to AND unit A2G by detector NOT unit DN. With these two control currents present AND unit A2G pulses DELAY unit D2G'.

DELAY unit D2G' times the vehicle extension interval which is the second portion of the minimum cross street right-of-way period. This interval represents the time required for a moving vehicle to pass the detector and move into the intersection.

Actuation of detector D by additional vehicles during the vehicle extension interval causes DELAY unit D2G' to reset and start timing again. Thus, continued actuation causes incremental increases in timing. This is accomplished through the interaction of detector NOT unit DN and AND unit A2G. While no call is present from detector D, NOT unit DN puts out a continuous current to AND unit A2G, which keeps DELAY unit D2G' continuously energized. When a call comes in from detector D, NOT unit DN interrupts its output to AND unit A2G which temporarily deenergizes DELAY unit D2G', causing it to reset and commence timing again.

To prevent cross street traffic from retaining control of the intersection for an indefinite period, maximum DELAY units D2M and D2M' are provided. Two timing units are provided because one standard timing unit, as presently manufactured, is unable to provide a time delay of sufficient duration. As explained in a prior paragraph, DELAY unit D2M was energized at the beginning of the cross street green interval. When DELAY unit D2M times out it energizes DELAY unit D2M'. If D2M' should time out before all cross street vehicles are passed, it turns on MEMORY device M2M to call the controller back to cross street after a guaranteed interval on main street.

Thus, when either the vehicle extension timer D2G' or the maximum timer D2M' time out, they pulse MEMORY unit M2A through OR unit CO. MEMORY unit M2A develops a continuous potential which turns off MEMORY unit M2G, maintains amplifier AR and therefore main street red signal, R through OR unit AO, energizes amplifier BA and therefore cross street amber signal 2A, and starts DELAY unit D2A. MEMORY unit M2G being turned off resets maximum DELAY units D2M and D2M' and deenergizes amplifier BG, and would deenergize amplifier AR. But ampilfier AR is now energized from another source.

Delay unit DR2A times the cross street amber signal 2A. Upon termination of the delay interval, DELAY unit D2A pulses MEMORY unit M1G. MEMORY unit M1G develops a continuous potential which energizes amplifier AG and amplifier BR through OR unit BO, turns off MEMORY unit M2A, and starts DELAY unit D1G timing the main street green guaranteed interval.

Amplifiers AG and BR being energized, illuminate the main street green signal 1G and the cross street red signal 2R, respectively.

Memory unit M2A being turned off deenergizes amplifier AR through OR unit AO, and deenergizes amplifier BA. Amplifier AR being deenergized extinguishes the main street red signal 1R. Amplifier BA being deenergized extinguishes the cross street amber signal 2A and the cycle is complete.

Assume now that continued actuation of detector D during the cross street vehicle interval permitted the maximum DELAY units D2M and D2M′ to time out. Repeated actuations break the current normally flowing from detector NOT unit DN to AND unit A2G, causing DELAY unit D2G′ to reset and retime. Continuous actuation causes DELAY unit D2G′ to time continuously and permits the cross street maximum DELAY unit D2M′ to complete timing. Thus the means for timing the cross street go signal in effect includes two timing sections; the first section timing a fixed portion of the go signal, and the second timing an extendable portion of the cross street go signal.

Upon completion of timing DELAY unit D2M′ sends a pulse to turn on maximum MEMORY unit M2M. MEMORY unit M2M sends a continuous potential to OR unit DO which in turn sends a continuous signal to AND unit A1G. When the main street guaranteed right-of-way interval has expired DELAY unit D1G′ also sends a continuous signal to AND unit A1G. If the synchronizing signal is present at the SYNC terminal the controller again moves out of the main street green interval, but otherwise awaits the synchronizing signal.

In the cross street right-of-way period those vehicles which were halted are allowed to pass. Should a cross street vehicle be stopped before it has reached detector D its passage during the green signal actuates detector D. Vehicle interval DELAY unit D2G′ allows additional time for each vehicle. If vehicle interval DELAY unit D2G′ times out before maximum DELAY unit D2M′ times out, right-of-way returns to main street. If, however, maximum DELAY unit D2M′ times out ahead of DELAY unit D2G′ the controller remembers that it has stranded vehicles on the cross street and after giving a guaranteed right-of-way interval to main street returns to give cross street at least one initial and one vehicle interval.

The detector circuit must accomplish three results. First, it must receive signals from one or more detectors D to turn off detector NOT unit DN. NOT unit DN normally emits a continuous signal applied to AND unit A2G and DELAY unit D2G′. This permits detector actuations during the cross street vehicle interval to reset DELAY unit D2G′.

Second, the detector circuit must remember a first call out of a series of calls. This is accomplished by detector MEMORY unit DM which when turned on energizes AND unit A1G through OR unit DO. Once a call is entered the controller merely waits until the synchronizing pulse appears on line SYNC and until the main street guarantee period has expired. When D1G′ times out and the other two signals are present, the controller starts into the cross street phase.

Third, the detector circuit must determine whether sufficient time was allowed to permit all of the vehicles on cross street to enter the intersection. If not, it must remember to call the controller through another cycle of operation to permit the vehicles stranded on cross street to use the intersection. This is done whenever the cross street maximum DELAY unit D2M′ times out ahead of DELAY unit D2G′.

When entering the main street amber interval MEMORY unit M1A puts out a continuous potential which serves also to turn off MEMORY unit M2M. This is the unit which remembers that vehicles were left on the cross street. Deenergization of MEMORY unit M2M is necessary so that it will not emit a continuous signal and cause continuous cycling.

As mentioned previously, it may be necessary to provide two DELAY units in series when a longer delay time is required than is available from a single DELAY unit. Examples of this are the main street guaranteed interval and the cross street maximum interval. Two DELAY units D1G and D1G′ are provided to time the guaranteed interval. Two DELAY units D2M and D2M′ are provided to time the maximum interval. The units are connected in series so that when the first unit times out it starts the second unit.

An AND unit A2M is provided as an isolation unit. It permits continuity for the signal circuit from MEMORY unit M2G, and serves to energize DELAY units D2M and D2M′.

Thus, all of the functions normally required of a two-phase semi-actuated controller are accomplished by the elements arranged as in FIGURE 1.

The traffic actuable detector or detectors D may be of the magnetic type as shown in United States Patent 2,201,-145. The detector amplifier (not shown but connected between the detector D and the input circuit to the controller) may be of the saturable reactor type shown in United States Patent 2,685,680. When detectors and detector amplifiers of this type are employed absolutely no contacts or relays need be used in or with the controller.

Two amplifier form

A description of a second form of the controller will be made with reference to FIGURE 2. The essential difference between the two forms lies in the method of energizing the signals. In the first form an amplifier is used to energize each signal indication. In the second form only two amplifiers are used to energize two load relays. The relative position of the two relays determines which signal indications are illuminated. The advantage of the second form is that fewer and smaller amplifiers are used. The operation of the load relays and signals is as explained in the section entitled "Signal Energization."

As a starting point assume that the controller is dwelling with the green signal illuminated to main street traffic. DELAY unit D1G has timed out energizing DELAY unit DEG′. DELAY unit D1G′ has timed out and is applying output to AND unit A1G. It is assumed that no detector actuations have been made and no calls are in. The main street green signal 1G became illuminated when DELAY unit D2A completed timing cross street amber signal 2A, energized MEMORY unit M1G which deenergized MEMORY unit M2A, which turned off amplifier B1. This in turn deenergized load relay B, and turned on the main street green signal 1G.

Assume also that the synchronizing current from a master or other local controller is applied over line SYNC to AND unit A1G permitting it to pulse when a call comes in.

Assume now that a vehicle approaches on cross street and actuates detector D which sends a pulse to NOT unit DN and then to MEMORY unit DM. The effect of NOT unit DN will be explained later. MEMORY unit DM now furnishes an output to OR unit DO which in turn energizes AND unit A1G. Since all three inputs are present at AND unit A1G it turns on MEMORY unit M1A which produces a continuous potential. The continuous potential turns off MEMORY unit M1G, energizes amplifier A1 through OR unit AO, turns off cross street maximum MEMORY unit M2M, and energizes main street amber DELAY unit D1A. When amplifier A1 was energized it energized load relay A, illuminating the main street amber signal 1A.

DELAY unit D1A times the main street amber signal 1A. When the unit times out it turns on MEMORY unit M2G which develops a continuous potential. The potential turns off MEMORY unit M1A, starts the cross street maximum DELAY unit D2M through isolation unit A2M, continues energization of amplifier A1 through OR unit AO, energizes amplifier B1 through OR unit BO, turns off detector MEMORY unit DM, and starts DELAY unit D2G.

DELAY unit D2G times the initial interval of the cross street green period. The detector MEMORY unit DM was turned off so that it would be ready to accept another call if another vehicle actuates detector D and NOT unit DN. Amplifiers A1 and B1 being energized, energize load relays A and B, which illuminate the cross street green signal 2G.

DELAY unit D2G times the initial portion of the cross street right-of-way interval. This represents the average time required by a vehicle stopped at the intersection to start up and enter the intersection. At the termination of the initial interval DELAY unit D2G sends a current to AND unit A2G. Another current is already applied to AND unit A2G by detector NOT unit DN. With these two control currents present, AND unit A2G energizes DELAY unit D2G', which when timed out pulses M2A through OR unit CO.

DELAY unit D2G' times the vehicle extension interval which is the second portion of the cross street right-of-way period. This interval represents the time required for a moving vehicle to pass the detector and move into the intersection.

Actuation of detector D by additional vehicles during the vehicle extension interval causes DELAY unit D2G' to reset and start timing again. An actuation of detector D causes NOT unit DN to interrupt current to AND unit A2G which removes current from D2G'. Thus, continued actuation of detector D causes incremental increases in timing. However, to prevent cross street traffic from retaining control of the intersection for an indefinite period, maximum DELAY unit D2M is provided. As explained in a prior paragraph, DELAY unit D2M was energized at the beginning of the cross street green interval. When DELAY unit D2M times out it energizes DELAY unit D2M'. If D2M' should time out before all cross street vehicles are passed, it energizes OR unit CO and therefor MEMORY device M2A, and also a MEMORY device M2M to call the controller back to cross street after a guaranteed interval on main street.

Thus, when either the vehicle extension timer D2G' or the maximum timer D2M' times out they pulse MEMORY unit M2A through OR unit CO. MEMORY unit M2A develops a continuous potential which turns off MEMORY unit M2G, maintains amplifier B1 through OR unit BO, and starts DELAY unit D2A. MEMORY unit M2G being turned off resets maximum DELAY units D2M and D2M' and deenergizes amplifier A1, and would deenergize amplifier B1. But amplifier B1 is now energized from another source. When amplifier A1 is deenergized, cross street amber signal 2A is illuminated.

DELAY unit D2A times the cross street amber signal 2A. Upon termination of the delay interval, DELAY unit D2A energizes MEMORY unit M1G. MEMORY unit M1G develops a continuous potential which turns off MEMORY unit M2A and starts DELAY unit D1G timing the main street green guaranteed interval. MEMORY unit M2A being turned off deenergizes OR unit BO which deenergizes amplifier B1 which deenergizes load relay B. Load relay B being deenergized illuminates the main street green signal 1G and the cycle is complete.

Assume now that continued actuation of detector D during the cross street vehicle interval permitted the maximum DELAY units D2M and D2M' to time out. Upon completion of timing a pulse is sent to turn on maximum MEMORY unit M2M. MEMORY unit M2M sends a continuous potential to OR unit DO which in turn sends a continuous signal to AND unit A1G. When the main street guaranteed right-of-way interval has expired DELAY unit D1G' also sends a continuous signal to AND unit A1G. If the synchronizer signal is present at the SYNC terminal the controller again moves out of the main street right-of-way interval.

In the cross street right-of-way period those vehicles which were halted are allowed to pass. Should a cross street vehicle be stopped ahead of detector D its passage actuates detector D. Vehicle interval DELAY unit D2G' allows additional time for each actuation. If vehicle interval DELAY unit D2G' times out before maximum DELAY unit D2M' times out, right-of-way returns to main street.

When entering the main street amber interval MEMORY unit M1A puts out a continuous potential which serves also to turn off MEMORY unit M2M. This is the unit which remembers that vehicles were left on the cross street. Deenergization of MEMORY unit M2M is necessary so that it will not emit a continuous signal and cause continuous cycling.

As mentioned previously, it may be necessary to provide two DELAY units in series when a longer delay time is required than is available from a single DELAY unit. Examples of this are the main street guaranteed interval and the cross street maximum interval. Two DELAY units D1G and D1G' are provided to time the guaranteed interval. Two DELAY units D2M and D2M' are provided to time the maximum interval. The units are connected in series so that when the first unit times out it starts the second unit.

An AND unit A2M is provided as an isolation unit. It permits continuity for the signal circuit from MEMORY unit M2G, and serves to energize DELAY units D2M and D2M'.

Thus, all of the functions required of a two-phase semi-actuated controller are effected by the elements connected as in FIGURE 2.

A controller of the type described above may be considered to consist of a group of timers connected in series: as one times out it starts the next one. Thus, it is similar to a ring counter or, more accurately, a ring timer.

A ring timer or ring type timer is defined in this application as an electric circuit comprised of a group of electrc elements connected in series to time a plurality of intervals in sequence. As employed in a two street semi-actuated controller, the ring timer is connected to dwell in a certain interval until traffic actuation on a cross street causes it to start timing through a cycle of operation. The circuit is self-maintained throughout the cycle and comes to rest at the end of the cycle. During the cycle it controls and times the illumination of the traffic signals through a light sequence which includes a caution signal to main street, a stop signal to main street and a go signal to cross street, then a caution signal to cross street, and finally a stop signal to cross street and a go signal to main street. Here the controller dwells until the next cross street traffic actuation.

The ring timer type of control may be applied to any multi-street controller. It may be employed as a two-street full-actuated controller, as a three-street semi-actuated, as a three-street full-actuated, or as a multistreet controller. It may be connected as a pretimed controller, giving set times to each traffic movement. It may be connected so that time to each street is extended by traffic actuation on that street.

It is normally required that two signal intervals be displayed to each traffic movement: a right of way interval and a caution interval. The right of way interval may be divided into a fixed or varied initial interval and a fixed or varied extendable vehicle interval. The caution interval may include only a single traffic signal change or may include two traffic signal changes. Each of the timed intervals is obtained through the use of a group of elements which include basically a memory element, a delay or timing element, and an amplifier element. Other elements are necessary for conditioning or supporting functions; these include AND elements which require that two or more prior conditions be present before a third condition may commence, OR elements which require that one or another condition be present before a third condition may commence, NOT elements which require that a first condition not be present for a second condition to continue.

Each of the elements which are combined to form the ring are *static, solid state means, such as* saturable reactor type elements. Each element contains one or more cores of magnetic material around which two or more coils are wound. Saturable reactor type elements have no moving parts, have no electric contacts, and employ no electron tubes. Since they are essentially a static or motionless device they operate for long periods of time without breakdown.

Three phase controller

Figure 3:
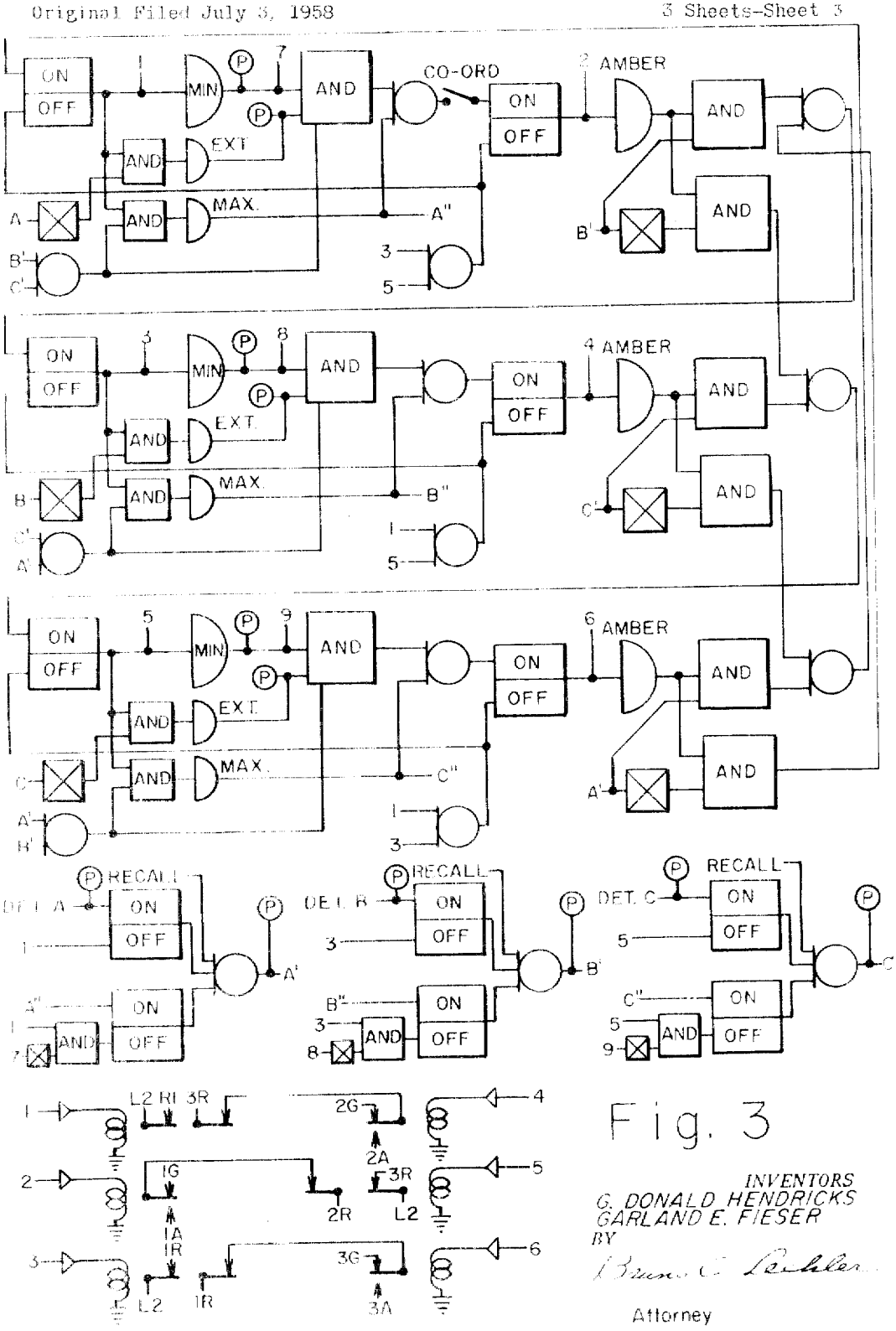
FIGURE 3 is a schematic diagram of a three-phase full-actuated traffic signal controller employing static, logic control and delay elements.

A three-phase fully actuated controller is shown in FIGURE 3. The device consists of three substantially identical delay units, one for each phase, three detector OR devices, and six amplifier and load relay units to energize the signals.

Each delay unit is capable of accepting signals from the detector for that street, and maintaining the right-of-way signal indication on the corresponding street for a limited time, or if another street has the right-of-way is capable of taking the right-of-way therefrom. In the latter condition, it can take right-of-way immediately if no further traffic actuations occur on the other two streets, or after a limited time if further actuations occur on the other streets.

Each delay unit provides its corresponding street with an adjustable minimum interval to permit a vehicle starting from rest to move into the intersection. The unit provides each subsequent vehicle with an adjustable extension interval timed to permit a vehicle to pass the detector and move into the intersection. The extension interval delay unit is reset each time a vehicle passes the detector and times simultaneously with the minimum interval delay unit. A maximum delay unit is provided to prevent one street from retaining control of the intersection for an indefinite period after a detector actuation on another street.

Each delay unit provides a timed clearance interval after the right-of-way period when a detector actuation occurs on another street. The clearance interval is delayed if detector actuations continue on the street which has right-of-way until a maximum delay has elapsed.

The control device is connected to maintain a given phase sequence if detector actuations occur repeatedly on the three streets. However, the device is able to skip any phase if actuations occur only on the other two phases. For example, if right-of-way resides with phase A and an actuation occurs on phase C, the controller will illuminate the caution signal to phase A and then the right-of-way signal to phase C without going through phase B. The same sequence is possible with the other two phases.

The control device is provided with recall switches which when closed permit the controller to dwell in the phase whose switch is closed. If two recall switches are closed the controller will time the minimum right-of-way interval on both phases alternately. If all three recall switches are closed the controller will time the minimum right-of-way interval to all three phases consecutively.

The controller is provided with a coordinating contact in the phase A control device. Its purpose is to prevent the controller from leaving the phase A right-of-way interval until permitted by an external control source. The external control is normally another traffic signal controller at a proximate intersection, with which it is desired to effect a timed relationship.

The traffic signals are energized from a local source of power and are controlled by a number of relays energized during the appropriate intervals through magnetic amplifiers controlled by potentials from the three control devices. Magnetic amplifiers may be used to energize the signals directly, thus eliminating the need for relays. An increase in service life and reliability could be expected but at an increased cost.

Any of the well known amplifiers may be substituted for the saturable reactor type amplifiers. However, this may result in lower reliability and shorter service life.

The components used in the three-phase controller are identical to those used in the two-phase controller. Thus, the circuit will not be explained in detail because one skilled in the art could derive a wiring diagram from the schematic diagram disclosed in FIGURE 3.

Having described three of the many forms the invention may assume it is understood that one skilled in the art may make many changes without departing from the spirit of the invention as illustrated in the appended claims.

We claim:

1. A traffic cycle controller for use at an intersection of a main street and a cross street, said cross street having traffic actuable detectors therein, a traffic signal for each direction of traffic at the intersection, each said signal having at least a stop, go, and caution signal indication, said signals connected to said traffic cycle controller and adapted to be energized therefrom, said controller having a first [saturable core reactor] *static, solid state* timing means connected to be started after actuation of one of said traffic actuable detectors and to cause said caution signal to said main street to be energized and timed, a second *static, solid state* [saturable core reactor] timing means connected to be started by said first timing means after it has timed out, said second timing means adapted to cause said go signal to said cross street to be energized and timed, and a third *static, solid state* [saturable core reactor] timing means connected to be started by said second timing means after it has timed out, said third timing means adapted to cause said caution signal to said cross street to be energized and timed, a fourth *static, solid state* [saturable core reactor] timing means connected to be started by said third timing means after it has timed out, said fourth timing means adapted to cause said go signal to said main street to be energized and timed for a guaranteed minimum interval, at a fifth [saturable core reactor] *static, solid state* timing means connected to be started by said second timing means when said second timing means times out, said fifth timing means adapted to cause said go signal to said cross street to continue to be energized and to be timed for an extendable interval, said fifth timing means adapted to be reset after actuation of one of said traffic actuable detectors while said fifth timing *means* is timing.

[2. In a traffic cycle controller as in claim 1, a sixth saturable core reactor timing means connected to be started also by said second timing means and connected to start said third timing means when said sixth timing means times out prior to said fifth timing means thereby limiting the duration of said cross street go signal.]

[3. In a traffic cycle controller as in claim 2, electric circuit means connected to be energized when said sixth timing means times out prior to said fifth timing means to simulate a detector actuation and thereby cause the controller to time another cycle after said main street guaranteed minimum interval.]

[4. In a traffic cycle controller as in claim 1, electric circuit means in parallel with said detectors and adapted to simulate a detector actuation and thereby cause the controller to time a cycle containing at least a minimum right of way interval to said cross street and at least a minimum right of way interval to said main street each cycle.]

5. In a controller employing [saturable reactor] *static, solid state* timing and control elements for use at the intersection of two or more streets, traffic detectors in at least one of said streets, at least stop, go, and caution signals for each said street, a ring type circuit consisting of a first DELAY unit adapted when energized to time a minimum go signal on one street, a first OR unit, a synchronizing line from an external source, a first AND unit connected to the three last named units and energized thereby when output is present from said three units; a first MEMORY unit connected to be turned on by the momentary output of said first AND unit, a second OR unit connected to be energized by the output of said first MEMORY unit, a first amplifier connected to be energized by the output of said second OR unit, a first load relay connected to be energized by said first amplifier and having contacts adapted to apply power to said caution signal on said one of said streets; a second DELAY unit connected to be energized by said first MEMORY unit and adapted to time said caution signal; a second MEMORY unit connected to be energized by said second DELAY unit when timed out, said second MEMORY unit connected to turn off said first MEMORY unit and to maintain energized said second OR unit and thereby maintain energized said first amplifier and said first load relay, a third OR unit also connected to be energized by said second MEMORY unit, a second amplifier connected to be energized by the output of said third OR unit, a second load relay connected to be energized by said second amplifier and having contacts adapted to apply power to said go signal on another of said streets; a third DELAY unit connected to be energized by the output of said second MEMORY unit and adapted to time an initial portion of the last said go signal; a second AND unit connected to be partially energized by said third DELAY unit, a first NOT unit energized by any one of said detectors and connected to partially energize said second AND unit when none of said detectors are actuated; a fourth DELAY unit connected to be energized by said second AND unit and adapted to time an extendable portion of said go signal interval; a fifth DELAY unit connected to be energized by said second MEMORY unit and adapted to time a maximum interval for the last said go signal; a fourth OR unit connected to be energized by said fourth and fifth DELAY units and adapted to be energized by whichever unit times out first; a third MEMORY unit connected to be energized by said fifth DELAY unit, and adapted when said fifth DELAY unit times out while said fourth DELAY unit is timing to energize said first OR unit and simulate a continuous detector actuation; a fourth MEMORY unit connected to be energized by said fourth OR unit and adapted to deenergize said second MEMORY unit and to maintain energized said third OR unit; said second OR unit adapted to be deenergized when said second MEMORY unit is deenergized, said first amplifier and said first load relay deenergized thereby and said caution signal to said other street energized by said contacts on said second load relay; a sixth DELAY unit connected to be energized by said fourth MEMORY unit and adapted to time said caution signal to said other street energized; a fifth MEMORY unit connected to be energized by said sixth DELAY unit when timed out, said fifth MEMORY unit connected to deenergize said fourth MEMORY unit and energize said first DELAY unit; said fourth MEMORY unit when deenergized adapted to deenergize said third OR unit, said second amplifier and said second load relay deenergized thereby, said go signal to said one street and said stop signal to said other street thereby energized by contacts on said first and second load relays; a sixth MEMORY unit connected to be energized by any one of said detectors and adapted to energize said first OR unit which in turn partially energizes said first AND unit, said sixth MEMORY unit connected to be deenergized by said second MEMORY unit; said ring type circuit started through a cycle of timing when said third or said sixth MEMORY units are energized.

6. In a traffic cycle controller for use at an intersection, a main street and a cross street at said intersection, traffic actuated detectors in the lanes of said cross street, traffic signals for each said street having stop, caution, and go signal indications, a source of power, first and second load relays having contacts connected between said source of power and said signals, and arranged to energize said main street go signal and said cross street stop signal when deenergized, and to energize said main street caution signal and cross street stop signal when said first relay is energized, and to energize said cross street go signal and said main street stop signal when said first and second relays are energized, and to energize said cross street caution signal when only said second relay is energized; first and second amplifiers connected to said source of power and adapted to energize said first and second relays respectively, means to energize a first static timer and simultaneously deenergize said second amplifier, said first static timer adapted to time said main street go signal for a guaranteed period, means made effective after said first static timer times out to energize a second static timer and simultaneously energize said first amplifier, said second static timer adapted to time said main street caution signal, said second timer started after the occurrence of first and second conditions, said first condition being that said first timer is timed out, said second condition being that one or more of said detectors is actuated, means made effective after said second static timer times out to energize a third static timer and simultaneously energize said second amplifier and maintain energized said first amplifier, said third static timer adapted to time an initial portion of said cross street go signal, means made effective after said third static timer times out to energize a fourth static timer, said fourth static timer adapted to time an extendable portion of said cross street go signal, and adapted to be reset by continued actuation of at least one of said detectors, means made effective when said fourth static timer has timed out to deenergize said first amplifier and to maintain energized said second amplifier, a fifth static timer energized by said means made effective after said second static timer times out and adapted to time concurrently with said third and fourth timers and adapted to limit the time continued detector actuations can hold the cross street green signal, means made effective by the first of said fourth and fifth timers timing out to deenergize said first amplifier and to maintain energized said second amplifier to thereby energize said cross street caution signal, a sixth static timer energized by the last named means and adapted to time said cross street caution signal, and the first named means made effective when said sixth timer times out to deenergize said second amplifier, and energize said main street go signal.

[7. In a traffic cycle controller as in claim 6, a static memory device energized by said fifth timer timing out ahead of said fourth timer after said fourth timer has timed a number of extension intervals to reenergize the second named means and cause it to energize said second timer after said first timer times out to simulate a detector actuation and prevent the stranding of vehicles when said fifth timer times out ahead of said fourth timer and limits the cross street green interval, said memory device deenergized when said second timer is energized.]

[8. In a traffic cycle controller as in claim 6, switch means connected to energize said second named means which is made effective after said first static timer times out, said switch means effective to simulate one detector actuation such that said controller times cyclically and continuously on a minimum cycle extendable by actual dector actuations occurring during the time said fourth static timer is timing.]

[9. In a traffic cycle controller as in claim 6, a static memory device connected between said detectors and said second timer and adapted to be energized after detector actuation to thereby remember said actuations, and circuit means responsive to the third named means to deenergize said memory device when said second timer times out.]

[10. In a traffic cycle controller as in claim 6, means effective after said fifth timer times out to simulate a detector actuation and energize the second named means to thereby reenergize said second static timer and reinitiate another cycle of said controller when continued detector actuations attempt to reset said fourth static timer beyond the period timed by said fifth static timer.]

[11. In a traffic cycle controller as in claim 6, detector actuation memory means connected between said detectors and said second named means, said third named means adapted to temporarily disable said detector memory means.]

12. In a static traffic controller for use at an intersection of a main street and a cross street, signals for each street, traffic detectors in the cross street, stop, go, and caution indications at each signal, a source of power, first and second load relays having contacts connected between said source of power and said signals and arranged to energize the main street go signal and the cross street stop signal when both relays are deenergized, to energize the cross street go signal and the main street stop signal when both relays are energized, to energize the main street caution signal when only said first relay is energized, and to energize the cross street caution signal when only said second relay is energized; said controller comprising a first and second amplifier connected to said source of power and adapted to energize said first and second relays respectively, a first MEMORY unit adapted when energized to turn off a fourth MEMORY unit, a first DELAY unit connected to be energized by said first MEMORY unit and adapted to time said main street go signal for a minimum interval, an external source of synchronizing signal, a fifth MEMORY unit energized by one of said detectors when actuated, a first AND unit adapted to develop a signal pulse only when energized by the combined outputs of said first DELAY unit and said synchronizing signal and a first OR unit, a second MEMORY unit connected to be energized by said first AND unit and adapted to deenergize said first MEMORY unit and a sixth MEMORY unit and energize said first amplifier and said main street caution signal, said first OR unit connected to be energized by either said fifth or sixth MEMORY units, a second DELAY unit connected to be energized by said second MEMORY unit and adapted to time said main street caution signal, a third MEMORY unit connected to be energized when said second DELAY unit times out and to deenergize said second and fifth MEMORY units and to energize third and fifth DELAY units and first and second amplifiers and said cross street go signal, said third DELAY unit adapted to time an initial portion of said cross street go signal, said fifth DELAY unit adapted to limit the maximum time of said cross street go interval, a NOT unit adapted to develop a continuous output except when energized by one of said detectors, a second AND unit connected to be partially energized by said third DELAY unit when timed out and partially energized by said NOT unit, a fourth DELAY unit connected to be energized by said second AND unit and adapted to time an extendable portion of said cross street go signal, a second OR unit connected to be energized by the earlier of said fourth or fifth DELAY units timing out, said fourth MEMORY unit connected to be energized by said second OR unit and connected to deenergize said third MEMORY unit and to energize a sixth DELAY unit and to retain energized said second amplifier and said cross street caution signal, said sixth DELAY unit adapted to time said cross street caution signal and when timed out to energize said first MEMORY unit.

13. In a traffic control device for controlling traffic at the intersection of three streets, traffic signals and traffic detectors for each said street, said control device having a controller circuit including static logic control elements forming logic circuits comprised of AND, NOT, OR, MEMORY and DELAY units, three logic circuits substantially similar to each other, one for each said street, each said circuit when signaled by at least one detector for its street when right of way resides with said street adapted to time an initial and a resettable right of way interval for said street, said resettable interval reset by traffic actuation during said interval, the duration of the total of said reset intervals controlled and timed so as not to exceed a maximum period after a detector actuation on either of the other streets; each said circuit when signaled by at least one detector for its street when right of way resides with either of the other streets adapted to energize and time a sequence of signals including a caution signal to the street having the right of way, thence a stop signal to that street and a right of way signal to its street, the total duration of said resettable intervals controlled and timed so as not to exceed a maximum period after a detector actuation on either of the other streets; said controller circuit also including means to skip a second street when right of way resides in a first street and a detector actuation occurs on a third street; and a recall selector circuit connected in one position to cause said sequence of signals to be repeated cyclically and continuously on said first, second, and third streets, and in another position to cause the controller to dwell when unactuated and energize the right of way signal to the selected street and to respond to detector actuations on said other streets and to return to said one street, and in another position adapted to cause the signal sequence to appear alternately and cyclically on any two streets omitting the third street except when detector is actuated; and said controller circuit including means to cause the control device to answer calls in a predetermined order.

14. In a static traffic controller for use at an intersection of a main street and a cross street, signals for each street, traffic detectors in the cross street, stop, go, and caution indications at each signal, a source of power, first and second load relays having contacts connected between said source of power and said signals and arranged to energize the main street go signal and the cross street stop signal when both relays are deenergized, to energize the cross street go signal and the main street stop signal when both relays are energized, to energize the main street caution signal when only said first rely is energized, and to energize the cross street caution signal when only said second relay is energized; said controller comprised of a first and second amplifier connected to said source of power and adapted to energize said first and second relays respectively, a first MEMORY unit adapted when energized to turn off a fourth MEMORY unit, a first DELAY unit connected to be energized by said first MEMORY unit and adapted to time said main street go signal for a minimum interval, a fifth MEMORY unit energized by one of said detectors when actuated, a first AND unit adapted to develop a signal pulse only when energized by the combined outputs of said first DELAY unit and a first OR unit, a second MEMORY unit connected to be energized by said first AND unit and adapted to deenergize said first MEMORY unit and a sixth MEMORY unit and energize said first amplifier and said main street caution signal, said first OR unit connected to be energized by either said fifth or sixth MEMORY unit, a second DELAY unit connected to be energized by said second MEMORY unit and adapted to time said main street caution signal, a third MEMORY unit connected to be energized when said second DELAY unit times out and to deenergize said second and fifth MEMORY units and to energize third and fifth DELAY units and first and second amplifiers and said cross street go signal, said third DELAY unit adapted to time an initial portion of said cross street go signal, said fifth DELAY unit adapted to limit the maximum time of said cross street go interval, a NOT unit adapted to develop a continuous output except when energized by one of said detectors, a second AND unit connected to be partially energized by said third DELAY unit when timed out and partially energized by said NOT unit, a fourth DELAY unit connected to be energized by said second AND unit and adapted to time an extendable portion of said cross street go signal, a second OR unit connected to be energized by the earlier of said fourth or fifth DELAY units timing out, said fourth MEMORY unit connected to be energized by said second OR unit and connected to deenergize said third MEMORY unit and to energize a sixth DELAY unit and to retain energized said second amplifier and said cross street caution signal, said sixth DELAY unit adapted to time said cross street caution signal and when timed out to energize said first MEMORY unit.

15. In a controller employing [saturable reactor] *static, solid state* timing and control elements for use at the intersection of at least two streets, traffic detectors in at least one of said streets, at least stop, go, and caution signals for each said street, a ring type circuit consisting of a first DELAY unit adapted when energized to time a minimum go signal on one street, a first OR unit, a first AND unit connected to the two last named units and energized thereby when an output is present from said two units; a first MEMORY unit connected and adapted to be energized by the momentary output of said first AND unit, a second OR unit connected to be energized by the output of said first MEMORY unit, a first amplifier connected to be energized by the output of said second OR unit, a first load relay connected to be energized by said first amplifier and having contacts adapted to apply power to said caution signal on one of said streets; a second DELAY unit connected to be energized by said first MEMORY unit and adapted to time said caution signal; a second MEMORY unit connected to be energized by said second DELAY unit when timed out, said second MEMORY unit connected to turn off said first MEMORY unit and to maintain energized said second OR unit and thereby maintain energized said first amplifier and said first load relay, a third OR unit also connected to be energized by said second MEMORY unit, a second amplifier connected to be energized by the output of said third OR unit, a second load relay connected to be energized by said second amplifier and having contacts adapted to apply power to said go signal on another of said streets; a third DELAY unit connected to be energized by the output of said second MEMORY unit and adapted to time an initial portion of said go signal; a second AND unit connected to be partially energized by said third DELAY unit, a first NOT unit energized by any one of said detectors and connected to partially energize said second AND unit when none of said detectors are actuated; a fourth DELAY unit connected to be energized by said second AND unit and adapted to time an extendable portion of said go interval; a fifth DELAY unit connected to be energized by said second MEMORY unit and adapted to time a maximum interval for said go signal; a fourth OR unit connected to be energized by said fourth and fifth DELAY units and adapted to be energized by whichever unit times out first; a third MEMORY unit connected to be energized by said fifth DELAY unit, and adapted when said fifth DELAY unit times out while said fourth DELAY unit is timing to energize said first OR unit and simulate a continuous detector actuation; a fourth MEMORY unit connected to be energized by said fourth OR unit and adapted to deenergize said second MEMORY unit and to maintain energized said third OR unit; said second OR unit adapted to be deenergized when said second MEMORY unit is deenergized, said first amplifier and said first load relay deenergized thereby and said caution signal to said other street energized by said contacts on said second load relay; a sixth DELAY unit connected to be energized by said fourth MEMORY unit and adapted to time said caution signal to said other street energized; a fifth MEMORY unit connected to be energized by said sixth DELAY unit when timed out, said fifth MEMORY unit connected to deenergize said fourth MEMORY unit and energize said first DELAY unit; said fourth MEMORY unit when deenergized adapted to deenergize said third OR unit, said second amplifier and said second load relay deenergized thereby, said go signal to said one street and said stop signal to said other street energized by contacts on said first and second load relays; a sixth MEMORY unit connected to be energized by any one of said detectors and adapted to energize said first OR unit which in turn partially energizes said first AND unit, said sixth MEMORY unit connected to be deenergized by said second MEMORY unit; said ring type circuit started through a cycle of timing when said third or said sixth MEMORY units are energized.

[16. In a controller employing saturable reactor timing and control elements for use at the intersection of at least two streets, traffic detectors in at least one of said streets, at least stop, go, and caution signals for each said street, a ring type circuit consisting of a first DELAY unit adapted when energized to time a minimum go signal on one street; a first OR unit, a first AND unit connected to the two last named units and energized thereby when an output is present from said two units; a first MEMORY unit connected and adapted to be energized by a momentary output of said first AND unit, a first amplifier connected to be energized by the output of said first MEMORY unit and a caution signal for one of said streets energized through said amplifier, a second OR unit connected to be energized by the output of said first MEMORY unit, a second amplifier connected to be energized by the output of said second OR unit, a stop signal for the other of said streets energized through said second amplifier; a second DELAY unit connected to be energized by said first MEMORY unit and adapted to time said caution signal; a second MEMORY unit connected to be energized by said second DELAY unit when timed out, said second MEMORY unit connected to turn off said first MEMORY unit, a third amplifier connected to be energized by the output of said second MEMORY unit, a go signal for said other street connected to be energized through said third amplifier, a third OR unit connected to be energized by said second MEMORY unit, a fourth amplifier connected to be energized by said third OR unit, a stop signal for said one street energized through said third OR unit; a third DELAY unit connected to be energized by the output of said second MEMORY unit and adapted to time an initial portion of said go signal; a second AND unit connected to be partially energized by said third DELAY unit, a first NOT unit energized by any one of said detectors and connected to partially energize said second AND unit while none of said detectors is actuated; a fourth DELAY unit connected to be energized by said second AND unit and adapted to time an extendable portion of said go signal; a fifth DELAY unit connected to be energized by said second MEMORY unit and adapted to time a maximum interval for said go signal; a fourth OR unit connected to be energized by said fourth and fifth DELAY units and adapted to be energized by whichever unit times out first; a third MEMORY unit connected to be energized by said fifth DELAY unit, and adapted when said fifth DELAY unit times out while said fourth DELAY unit is timing to energize said first OR unit and simulate a continuous detector actuation; a fourth MEMORY unit connected to be energized by said fourth OR unit and adapted to deenergize said second MEMORY unit and to retain energized said third OR unit and said stop signal for said one street, a fifth amplifier connected to be energized by said fourth MEMORY unit, a caution signal for said other street connected to be energized through said fifth amplifier; a sixth DELAY unit connected to be energized by said fourth MEMORY unit and adapted to time said caution signal to said other street; a fifth MEMORY unit connected to be energized by said sixth DELAY unit when timed out, said fifth MEMORY unit connected to deenergized said fourth MEMORY unit and energized said first DELAY unit, a sixth amplifier connected to be energized by said fifth MEMORY unit, said go signal for said one street connected to be energized through said sixth amplifier, said second OR unit connected to be energized by said fifth MEMORY unit to retain energized said stop signal for said other street; a sixth MEMORY unit connected to be energized by any one of said detectors and adapted to energize said first OR unit which in turn partially energizes said first AND unit, said sixth MEMORY unit connected to be deenergized by said second MEMORY unit; said ring type circuit restarted through a cycle of timing after said third or said sixth MEMORY units are energized.]

17. A traffic cycle controller for use at an intersection of a main street and a cross street, said cross street having traffic actuable detectors therein, a traffic signal for each direction of traffic at the intersection, each said signal having at least a stop, go, and caution signal indication, said signals connected to said traffic cycle controller and adapted to be energized therefrom, said controller having a first [saturable core reactor] *static, solid state* timing means connected to be started after actuation of one of said traffic actuable detectors and to cause said caution signal to said main street to be energized and timed, a second [saturable] *static, solid state* [core reactor] timing means connected to be started by said first timing means after it has timed out, said second timing means adapted to cause said go signal to said cross street to be energized and timed, and a third *static, solid state* [saturable core reactor] timing means connected to be started by said second timing means after it has timed out, said third timing means adapted to cause said caution signal to said cross street to be energized and timed, a fourth [saturable core reactor] *static, solid state* timing means connected to be started by said third timing means after it has timed out, said fourth timing means adapted to cause said go signal to said main street to be energized and timed for a guaranteed minimum interval, electric circuit means in parallel with said detectors adapted to simulate continuous actuation of said detectors thereby causing the controller to time continuously and cyclically.

18. A traffic cycle controller for use at an intersection of a main street and a cross street, said cross street having traffic actuable detectors therein, a traffic signal for each direction of traffic at the intersection, each said signal having at least a stop, go, and caution signal indication, said signals connected to said traffic cycle controller and adapted to be energized therefrom, said controller having a first [saturable core reactor] *static, solid state* timing means connected to be started after actuation of one of said tragc actuable detectors and to cause said caution signal to said main street to be energized and timed, a second [saturable core] *static, solid state* [reactor] timing means connected to be started by said first timing means after it has timed out, said second timing means adapted to cause said go signal to said cross street to be energized and timed, and a third [saturable core] *static, solid state* [reactor] timing means connected to be started by said second timing means after it has timed out, said third timing means adapted to cause said caution signal to said cross street to be energized and timed, a fourth [saturable] *static, solid state* [core reactor] timing means connected to be started by said third timing means after it has timed out, said fourth timing means adapted to cause said go signal to said main street to be energized and timed for a guaranteed minimum interval, said second [saturable core reactor] timing means including a first timing section and a second timing section connected to be started by the said first timing section when the first section times out, said second section adapted to cause said go signal to said cross street to continue to be energized and to be timed for an extendable interval, said second section adapted to be reset after actuation of one of said traffic actuable detectors while said second section is timing.

[19. In a traffic cycle controller as in claim 18, a fifth saturable core reactor timing means connected to be started also by the first section of the second timing means and connected to start said third timing means when said fifth timing means times out prior to said second section of the second timing means thereby limiting the duration of the cross street go signal.]

*20. In a traffic controller for controlling traffic signals for displaying go, caution and stop intervals to main street and cross street traffic flow at a traffic flow intersection, the improvement comprising: a plurality of static, solid state logic memory means one each for main street and cross street go and caution intervals, each said memory means having an input and an output and having a first condition and a second condition, a like plurality of static, solid state timing means each coupling the output of a preceding memory means with the input of a succeeding memory means for timing the first condition of said preceding memory means for a predetermined period of time and then actuating said succeeding memory means to its said first condition, and means coupling the output of each said succeeding memory means with the input of a said preceding memory means for actuating said preceding memory means to its said second condition when said succeeding memory means is in its first condition.*

*21. In a traffic controller as set forth in claim 20 wherein: the outputs of said main street go and caution memory means are respectively adapted to be connected to said main street go and caution traffic signals for displaying main street go and caution intervals when said main street go and caution memory means are respectively in said first condition, the outputs of said cross street go and caution memory means are respectively adapted to be connected to said cross street go and caution traffic signals for displaying cross street go and caution intervals when said cross street go and caution memory means are respectively in said first condition, first circuit means responsive to the condition of said main street go and caution memory means for energizing said cross street stop traffic signal for displaying a cross street stop interval when either said main street go or caution memory means is in its first condition, and second circuit means responsive to the condition of said cross street go and caution memory means for energizing said main street stop traffic signal for displaying a main street stop interval when either said cross street go or caution memory means is in its first condition.*

*22. In a traffic controller as set forth in claim 21 wherein: said first and second circuit means each includes a static, solid state means OR circuit.*

*23. In a traffic controller as set forth in claim 20 including circuit means connected to said main street go timing means coupling the output of said main street go memory means with the input of said main street caution memory means, said circuit means responsive to only a first condition of said main street go memory means and a traffic detection by a cross street traffic detector means to cause said main street caution memory means to change from its second condition to its first condition.*

*24. In a traffic controller as set forth in claim 23 wherein said circuit means is between said main street go timing means and the input of said main street caution memory means.*

*25. In a traffic controller as set forth in claim 24 wherein said circuit means includes a static, solid state means AND circuit.*

*26. In a traffic controller as set forth in claim 23 including means for extending the cross street go interval comprising a second cross street go timing means and an AND circuit means connected together between the first cross street go timing means and the input of said cross street caution memory means, said AND circuit means being between said first and second cross street go timing* means, said AND circuit means energizing said second cross street go timing means for timing a cross street extension interval only when said first cross street go timing means has timed out and there is no traffic detection by said cross street traffic detector means.

27. In a traffic controller as set forth in claim 23 including means for extending the cross street go interval comprising: a second cross street go timing means and an AND circuit means connected together between the first cross street go timing means and the input of said cross street caution memory means, said AND circuit means being between said first and second cross street go timing means, and NOT circuit means responsive to said cross street detector means for providing a signal to said AND circuit means only if there is not a vehicle detection, said AND circuit means energizing said second cross street go timing means for timing a cross street extension interval only when said first cross street go timing means has timed out and said signal is provided by said NOT circuit means.

28. In a traffic controller as set forth in claim 26 including means for limiting the cross street go interval comprising cross street go maximum interval timing means responsive to a first condition of said cross street go memory means for timing a maximum interval, OR circuit means between said second cross street go timing means and the input of said cross street caution memory means, said OR circuit means responsive to said maximum interval timing means and said second cross street go timing means for actuating said cross street caution memory means to its first condition when either said maximum interval timing means or said second cross street go timing means has timed out.

29. In a traffic cycle controller as in claim 1, a sixth static, solid state timing means connected to be started also by said second timing means and connected to start said third timing means when said sixth timing means times out prior to said fifth timing means thereby limiting the duration of said cross street go signal.

30. In a traffic cycle controller as in claim 29, electric circuit means connected to be energized when said sixth timing means times out prior to said fifth timing means to simulate a detector actuation and thereby cause the controller to time another cycle after said main street guaranteed minimum interval.

31. In a traffic cycle controller as in claim 1, electric circuit means in parallel with said detectors and adapted to simulate a detector actuation and thereby cause the controller to time a cycle containing at least a minimum right of way interval to said main street each cycle.

32. In a traffic cycle controller as in claim 6, a static memory device energized by said fifth timer timing out ahead of said fourth timer after said fourth timer has timed a number of extension intervals to reenergize the second named means and cause it to energize said second timer after said first timer times out to simulate a detector actuation and prevent the stranding of vehicles when said fifth timer times out ahead of said fourth timer and limits the cross street green interval, said memory device deenergized when said second timer is energized.

33. In a traffic cycle coltroller as in claim 6, switch means connected to energize said second named means which is made effective after said first static timer times out, said switch means effective to simulate one detector actuation such that said controller times cyclically and continuously on a minimum cycle extendable by actual detector actuations occurring during the time said fourth static timer is timing.

34. In a traffic cycle controller as in claim 6, a static memory device connected between said detectors and said second timer and adapted to be energized after detector actuations to thereby remember said actuations, and circuit means responsive to the third named means to deenergize said memory device when said second timer times out.

35. In a traffic cycle controller as in claim 6, means effective after said fifth timer times out to simulate a detector actuation and energize the second named means to thereby reenergize said second static timer and reinitiate another cycle of said controller when continued detector actuations attempt to reset said fourth static timer beyond the period timed by said fifth static timer.

36. In a traffic cycle controller as in claim 6 detector actuation memory means connected between said detectors and said second named means, said third named means adapted to temporarily disable said detector means.

37. In a controller employing static, solid state timing and control elements for use at the intersection of at least two streets, traffic detectors in at least one of said streets, at least stop, go, and caution signals for each said street, a ring type circuit consisting of a first DELAY unit adapted when energized to time a minimum go signal on one street; a first OR unit, a first AND unit connected to the two last named units and energized thereby when an output is present from said two units; a first MEMORY unit connected and adapted to be energized by a momentary output of said first AND unit, a first amplifier connected to be energized by the output of said first MEMORY unit and a caution signal for one of said streets energized through said amplifier, a second OR unit connected to be energized by the output of said first MEMORY unit, a second amplifier connected to be energized by the output of said second OR unit, a stop signal for the other of said streets energized through said second amplifier; a second DELAY unit connected to be energized by said first MEMORY unit and adapted to time said caution signal; a second MEMORY unit connected to be energized by said second DELAY unit when timed out, said second MEMORY unit connected to turn off said first MEMORY unit, a third amplifier connected to be energized by the output of said second MEMORY unit, a go signal for said other street connected to be energized through said third amplifier a third OR unit connected to be energized by said second MEMORY unit, a fourth amplifier connected to be energized by said third OR unit, a stop signal for said one street energized through said third OR unit; a third DELAY unit connected to be energized by the output of said second MEMORY unit and adapted to time an initial portion of said go signal; a second AND unit connected to be partially energized by said third DELAY unit, a first NOT unit energized by any one of said detectors and connected to partially energize said second AND unit while none of said detectors is actuated; a fourth DELAY unit connected to be energized by said second AND unit and adapted to time an extendable portion of said go signal; a fifth DELAY unit connected to be energized by said second MEMORY unit and adapted to time a maximum interval for said go signal; a fourth OR unit connected to be energized by said fourth and fifth DELAY units and adapted to be energized by whichever unit times out first; a third MEMORY unit connected to be energized by said fifth DELAY unit, and adapted when said fifth DELAY unit times out while said fourth DELAY unit is timing to energize said first OR unit and simulate a continuous detector actuation; a fourth MEMORY unit connected to be energized by said fourth OR unit and adapted to deenergize said second MEMORY unit and to retain energized said third OR unit and said stop signal for said one street, a fifth amplifier connected to be energized by said fourth MEMORY unit, a caution signal for said other street connected to be energized through said fifth amplifier; a sixth DELAY unit connected to be energized by said fourth MEMORY unit and adapted to time said caution signal to said other street; a fifth MEMORY unit connected to be energized by said sixth DELAY unit when timed out, said fifth MEMORY unit connected to de-

*energized said fourth MEMORY unit and energized said first DELAY unit, a sixth amplifier connected to be energized by said fifth MEMORY unit, said go signal for said one street connected to be energized through said sixth amplifier, said second OR unit connected to be energized by said fifth MEMORY unit to retain energized said stop signal for said other street; a sixth MEMORY unit connected to be energized by any one of said detectors and adapted to energize said first OR unit which in turn partially energizes said first AND unit, said sixth MEMORY unit connected to be deenergized by said second MEMORY unit; said ring type circuit restarted through a cycle of timing after said third or said sixth MEMORY units are energized.*

*38. In a traffic cycle controller as in claim 18, a fifth static, solid state timing means connected to be started also by the first section of the second timing means and connected to start said third timing means when said fifth timing means times out prior to said second section of the second timing means thereby limiting the duration of the cross street go signal.*

References Cited by the Examiner

The following references, cited by the Examiner, are of record in the patented file of this patent or the original patent.

UNITED STATES PATENTS

| | | | |
|---|---|---|---|
| 2,218,711 | 10/1940 | Hubbard | 336—110 |
| 2,241,047 | 5/1941 | Wilcox | 340—36 |
| 2,594,276 | 4/1952 | Barker | 340—38 |
| 2,624,786 | 1/1953 | Potter | 250—208 |
| 2,665,417 | 1/1954 | Alles | 340—40 |
| 2,685,680 | 8/1954 | Williams | 340—38 |
| 2,877,454 | 3/1959 | Zedlar | 340—38 |
| 2,878,423 | 3/1959 | Kips et al. | 340—71 |
| 2,932,003 | 4/1960 | Barker | 340—40 |

OTHER REFERENCES

Milnes: Transductors and Magnetic Amplifiers, published by McMillan & Co., 1957, pages 259–260.

NEIL C. READ, *Primary Examiner.*

THOMAS B. HABECKER, *Examiner.*